United States Patent [19]

Smith

[11] Patent Number: 4,597,297

[45] Date of Patent: Jul. 1, 1986

[54] TENSION MEASUREMENT DEVICE

[75] Inventor: Glendon C. Smith, Anderson, S.C.

[73] Assignee: Badische Corporation, Williamsburg, Va.

[21] Appl. No.: 584,367

[22] Filed: Feb. 28, 1984

[51] Int. Cl.⁴ .............................................. G01L 5/10
[52] U.S. Cl. .................................................. 73/862.48
[58] Field of Search ........... 73/862.45, 862.47, 862.48, 73/862.62, 862.64, 862.07

[56] References Cited

U.S. PATENT DOCUMENTS

| | | | |
|---|---|---|---|
| 3,365,941 | 1/1968 | Grant | 73/117 |
| 3,371,526 | 3/1968 | Fathauer | 73/862.64 |
| 3,526,129 | 9/1970 | Anderson | 73/862.48 X |
| 3,739,633 | 6/1973 | Saxl | 73/862.48 X |
| 3,824,846 | 7/1974 | Andersson | 73/862.48 X |

Primary Examiner—Charles A. Ruehl
Attorney, Agent, or Firm—Rupert B. Hurley, Jr.

[57] ABSTRACT

A tension measurement device, the device being four-sided, the device utilizing a parallelogram configuration. The tension measurement device utilizes a two-part position sensor which is preferably a Hall-Effect device. The tension measurement device utilizes two deformable, resilient connecting members which are preferably leaf springs, the device being exceptionally simple and durable.

17 Claims, 4 Drawing Figures

TENSION MEASUREMENT DEVICE

BACKGROUND OF THE INVENTION

1. Field of Invention

The present invention pertains to a measurement device which is generally known as a dynamometer. A dynamometer is a device for measuring force, torque, work, or mechanical power. The specific dynamometer disclosed herein is a device which has a means which is responsive to a load, the means being capable of measuring the tautness of a line. The device has a means for sensing the deflection of an element. The device also has an elastic deflecting member. Furthermore, the device of the present invention senses the deflection of the elastic member and converts the signal from the sensing means into an electric current or voltage.

2. Description of the Prior Art

Three U.S. patents disclose subject matter which, with respect to the present invention, is the closest prior art of which applicants are aware. These three patents are U.S. Pat. No. 3,526,129 (to Anderson), U.S. Pat. No. 3,444,731 (to Nieuweboer), and U.S. Pat. No. 3,240,281 (to Schaevitz). These three patents are discussed in detail below. Applicant is aware of several other U.S. Pat. Nos. which are related to the present invention, including: 3,060,370; 3,376,740; 4,130,014; 4,326,424.

U.S. Pat. No. 3,526,129, to A. Anderson, discloses a device for measuring tensile forces. The device includes both upper plate sections (4 and 5) and lower plate sections (1 and 2). The upper plate sections are parallel to the lower plate sections. The upper plate sections are connected to the lower plate sections by:

(a) four resilient members (7); and (b) an assembly which is comprised of: two rigid members (8) and (9) which are bolted to the upper plate sections, the two rigid members having two bolt-like members (12 and 13) threaded therethrough, the bolt-like members in turn contacting a first support (14), the first support (14) in turn being bolted to the upper ends of a pair of arms (15 and 16), on which are arranged a pair of magnetoelastic transmitters (18), the lower ends of the arms (15 and 16) being bolted to a second support (17), the second support in turn being bolted to the lower plate sections.

Although Anderson discloses neither the detailed structure of each of the parts nor a detailed description of the movements of the parts during operation of the device, several facts are apparent upon careful analysis of the Anderson patent by one of skill in the art:

(1) the two arms (15 and 16) extend through the magnetoelastic transmitters—Anderson even implies this in (b) above.

(2) The bolt-like members 12 and 13 must slide against the support 14 during functioning of the resilient rods 7 due to the force exerted perpendicular to the plates 1, 2, 4, and 5. If the bolt members did not slide, the resilient members (7) would not deform because of the rigid connection between the lower plates 1 and 2 and the upper plates 4 and 5 via path (b) described above.

The instant invention differs from Anderson in several ways. Most importantly, in the instant invention, the force which is exerted upon the article-contacting means moves the traveling member a distance X which, absent damping, is substantially proportional to the amount of force f necessary to deform applicant's resilient members enough for applicant's traveling member to move a distance X. In contrast, Anderson's device requires much greater force than that force which is required to simply deform Anderson's resilient rods 7. In fact, Anderson's device does not have any significant "side-to-side" movement because Anderson has a rigid side-to-side linkage occurring from parts 4 and 5 through parts 8 and 9, through parts 12 and 13, through 14, through 15 and 16, through 19, through to 1 and 2. Furthermore, Anderson's device requires substantial side-to-side rigidity because the magnetoelastic sensors operate with a range of motion of only a few thousandths (i.e. less than 0.005 inches) of an inch at most. In Anderson's device, the force required to move the upper plate a distance X "sideways" is much greater than the force required to deflect Anderson's springs (7) sideways by that amount. In fact, Anderson's device will not even move sideways any significant amount. Anderson's springs act as thin columns which buckle under load. In addition, Anderson uses a completely different type of sensor from applicant's, and Anderson does not disclose that his leaf springs are fixedly secured to the upper and lower plate sections, as applicant requires his connecting members to be.

U.S. Pat. No. 3,444,731 to Nieuweboer discloses a "parallelogram-shaped linkage" which is "attached to (a) base". The Nieuweboer device utilizes "flexural pivots" which are spring-loaded. Additionally, the Nieuweboer device utilizes a Hall effect sensor for sensing a change in position of one of the rigid linkage arms with respect to the base of the device. In contrast, Applicant's device utilizes not a parallelogram linkage but a parallelogram-shaped device, the difference being that Nieuweboer utilizes his parallelogram to "link" a first portion of the sensor with a second portion of the sensor, the second portion being in a position which is independent of the parallelogram, whereas applicant's device has a sensor completely within a parallelogram, applicant's device sensing a change in the angles by measuring a change in position of one side of the parallelogram with respect to the opposite side of the parallelogram. Thus, applicant's device has fewer moving parts than Nieuweboer. Applicant's connecting members allow for essentially "frictionless" movement of the traveling member, while Nieuweboer's "flectural pivots" undoubtedly must be more complex and more costly.

U.S. Pat. No. 3,240,281 to Schaevitz discloses a balance which employs ". . . a parallelogram adapted to be moved about the rigidly mounted member 12. The outer member 14 is physically connected to the mounted member 12 through flexure elements 32 and 34". Thus Schaevitz has a parallelogram and he utilizes at least 6 flexural elements similar to applicant's leaf springs. However, Schaevitz discloses a two-piece sensor, a first piece being fixed to one side of the parallelogram and a second piece being fixed to a "mounted member". In contrast, applicant's device has the sensor mounted within the parallelogram. In addition, Schaevitz requires all four sides of the parallelogram to move, whereas applicant's device allows only three sides of the parallelogram to change position.

BRIEF SUMMARY OF THE INVENTION

The tension measurement device of the present invention is a four-sided assembly which is comprised of a support member, a traveling member, at least two deformable, resilient connecting members, an article-contacting means, and a two-part position sensor. The connecting members are fixedly attached (and non-pivoting) to both the traveling member and the support member. The two parts making up the position sensor are separated by a space, with the first part of the position sensor being mounted on the support member and the second part of the position sensor being mounted on the traveling member. The device has the characteristic that, absent damping, a force f displaces the traveling member a distance X where the force is substantially the same amount of force as is required to deform the resilient members enough for the traveling member to be displaced by the distance X.

DETAILED DESCRIPTION OF THE PREFERRED EMBODIMENTS

Figure 1:
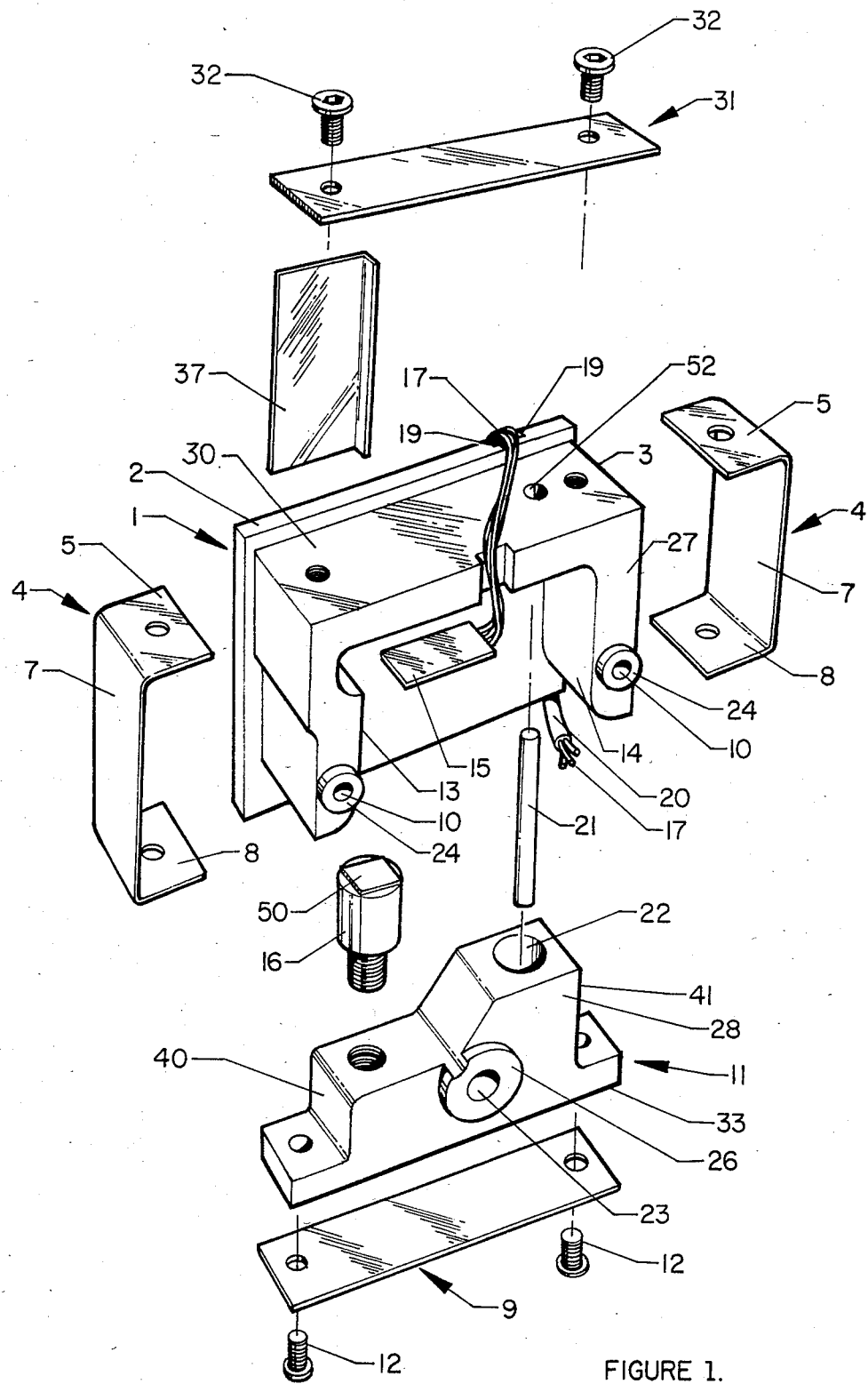
FIG. 1 illustrates an exploded view of a preferred embodiment of the present invention.
Figure 2:
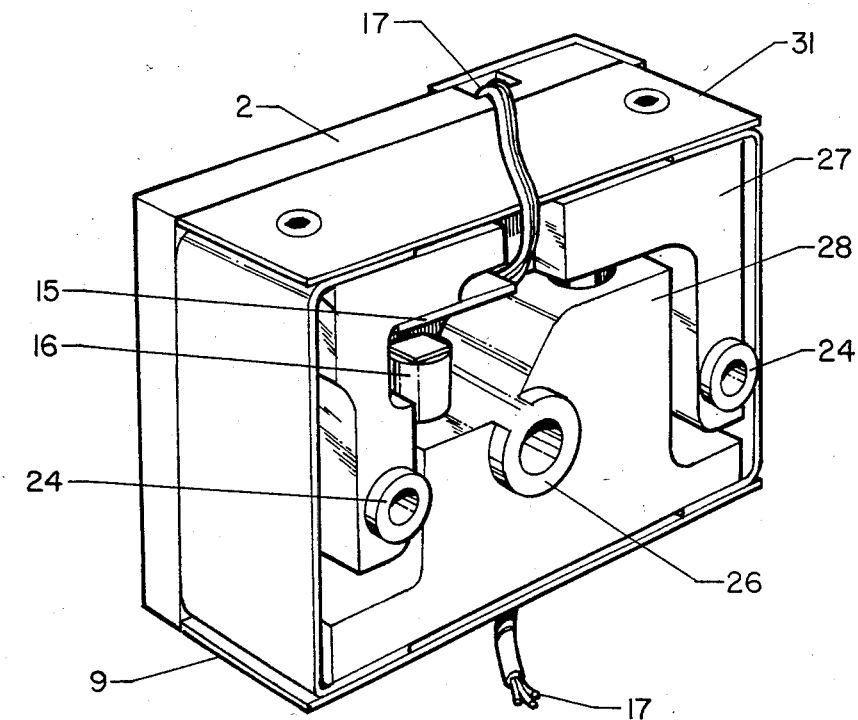
FIG. 2 illustrates a similar view of the same device when assembled.

The discussion below will pertain to all three figures, but FIG. 1 is the most revealing regarding the structure of the preferred embodiment.

In the preferred device as illustrated, a support member (1) is machined out of a block of metal, most preferably 2024 aluminum. In general the support member (1) is itself supported by being clamped, bolted, etc. to the equipment on which the tension sensor is being used. In the preferred embodiment, the support member is bolted to a shield plate (not shown), via two threaded holes (10). The holes (10) are accompanied by protruding mounting bosses (24). As can be seen, the support member (1) is comprised of a rectangular back portion (2) and an irregularly-shaped raised portion (3). The raised portion (3) has functional surfaces (13), (14), (27), (30) and others thereon. The device is further comprised of two resilient connecting members (4), each of which has a first end (5), a second end (8) and a connecting portion (7). The first ends (5) of both resilient connecting members (4) are positioned on a top surface (30) of the raised portion (3) of the support member (1). The first ends (5) are sandwiched between the top surface (30) and an upper plate member (31). Two upper screw members (32) fixedly secure both the upper plate (31) to the first ends (5), and the first ends (5) to the support member (1). The second ends (8) of both resilient connecting members (4) are sandwiched between a lower plate (9) and a lower surface (33) of a traveling member (11). The traveling member (11) has several functional surfaces (22), (26), (28), (33), (40), (41), among others, which are described in detail below. The lower screw members (12) secure both the lower plate (9) to the second ends (8), and the second ends (8) to the traveling member (11).

The assembly of the support member (1), the two connecting members (4) and the traveling member (11) form a four-sided device. The preferred four-sided device, as illustrated, allows a limited amount of "left-right" travel of the traveling portion (11). The "limits" governing the amount of travel to the "left" or to the "right" are set by: (a) a left limit surface (13) formed by the raised portion (3) and a "right" limit surface (14) formed by the raised portion (3); and (b) the rest position of the traveling member (11); and (c) the position of surface 40 with respect to surface 13, and the position of surface 41 with respect to surface 14. In the preferred device, the rest position of the traveling member provides a clearance of about 0.010 inches to the left of the left-most surface 40 of the traveling member, and about 0.125 inches to the right of the right-most surface 41 of the traveling member. Note that the traveling member (11) has a substantially centrally located passageway (23), the passageway being sized for fastening an article-contacting means thereto, the article-contacting means preferably being rotatable. The passageway (23) is accompanied by a protruding mounting surface (26).

Figure 3:
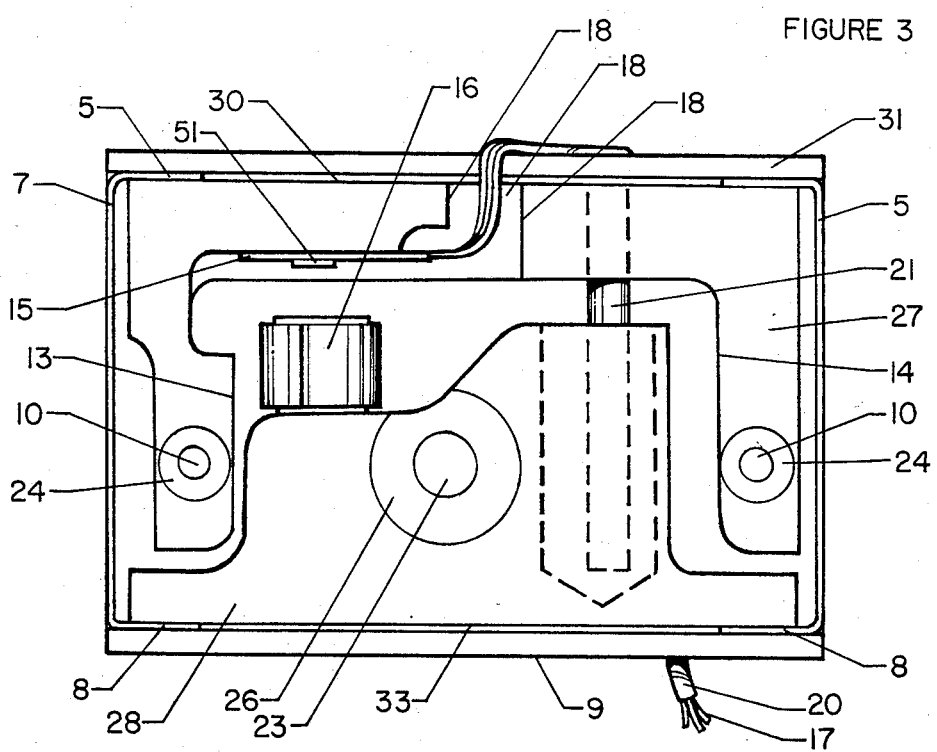
FIG. 3 is a front cross-sectional view which is illustrated for purposes of disclosing the relative proportions of the parts of the preferred apparatus.
Figure 4:
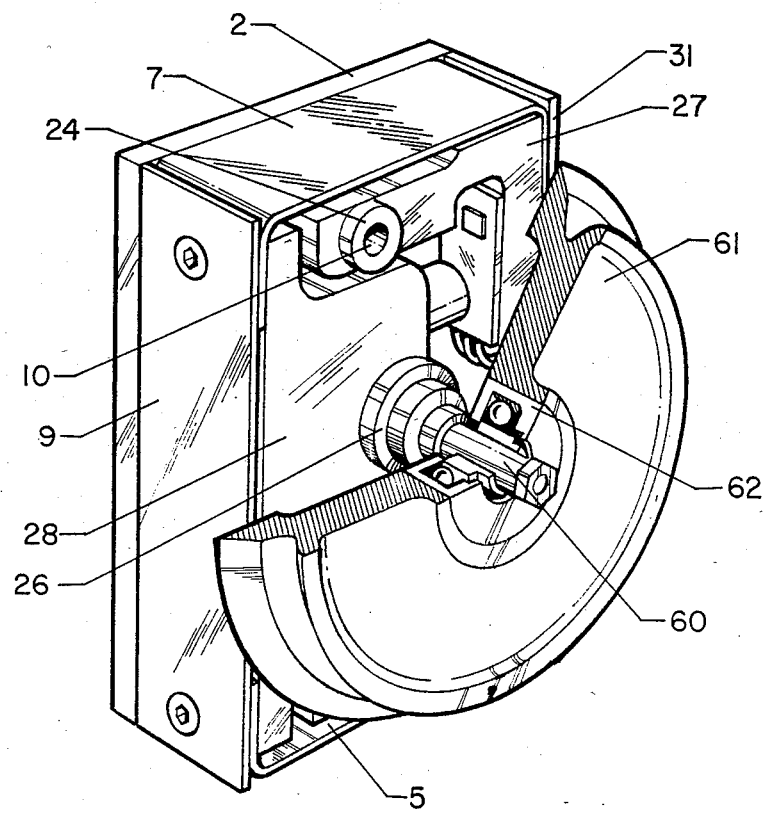
FIG. 4 is a perspective cutaway view of the device along with other associated members. In all of the views, like numerals refer to like members.

A two-part sensor (15 and 16) is used to detect a position of the traveling member (11) with respect to the support member (1). The traveling member (11) has a permanent magnet (50) embedded in a treaded mount (16). The support member (1) has a Hall-Effect sensor (15) fixedly secured thereto, with wires (17) connected to the sensor (15). In the preferred embodiment, the Hall-Effect sensor is held in place by adhesive and by being completely embedded in a silicone rubber, the north-seeking pole of the magnet being positioned about 0.125 inches from the Hall-Effect sensor. As shown in FIG. 3, the Hall-effect sensor (15) has an "active area" (51) positioned as indicated. The wires (17) from the Hall-Effect sensor (15) run through a notch [formed by three surfaces 18 in front of support member 1] and over the upper plate member (31), and into a slot [formed by three surfaces 19 in the back of support member 1]. The wires (17) emerge from the bottom of the device (25) in a casing (20).

The preferred device of the present invention also employs fluid damping means, the damping being created by a stainless steel rod (21), the rod (21) being attached by being pressed through a hole (52) in the support member (1), the rod (21) being positioned within a cavity which is formed by interior surface (22) in the traveling member (11). The cavity may be filled with a damping fluid of a desired viscosity. In the preferred embodiment, the cavity is "oversized" in the sense that the rod (21) never touches the interior surface of (22) within the "left-right" range of travel of the traveling member. In the preferred embodiment, the fluid used in the cavity is a silicone-based fluid made by Dow Corning, and had a viscosity of 100,000 centistokes.

In the mounting of the device, it should be noted that the mounting surface (27) of the support member (1) is in a plane about 0.030 inches above the front surface (28) of the traveling member (11). Thus, the traveling member does not contact the support member or the machine to which the device is mounted in normal operation. In case of overloading forces, the displacement of the traveling member is stopped before the resilient members are permanently deformed. Upon mounting the device, the bosses (24) partly enter similar sized holes in a plate (not shown, preferably the plate is non-magnetic) to which the device is mounted. The plate has a hole through which a shaft (60) passes, the shaft being screwed into the passageway (23) within the traveling portion, the passageway (23) being threaded. The shaft in turn has a yarn-contact roller (61) mounted thereon, the roller being freewheeling via bearings 62. The characteristics of the roller are chosen to suit the yarn it will contact and the environment in which the tension measurement device is to be used. A non-rotatable yarn contact member could have been used instead, but is not preferred.

In the preferred embodiment of the present invention, the resilient connecting members (4) are leaf springs. Leaf springs have the advantage of only undergoing substantial bending in a plane perpendicular to their major surface, i.e. leaf springs do not undergo substantial "sideways" bending. In addition, leaf springs can be manufactured in a bent configuration which allows the spring to have mountable ends, such as ends (5) and (8) of the connecting members (4) of the present invention. This provides convenient means for mounting the connecting members, i.e. it eliminates the need for additional parts. Another advantage in the use of leaf springs lies in the fact that the flexing of the spring involves no rubbing between two rigid objects. Leaf springs are considered advantageous in tension devices because the amount of force necessary to cause a deflection is believed to remain constant over a long period of use, if the springs are protected against overloads as in the preferred embodiment of the present invention.

In the present invention, a Hall Effect sensor is the preferred sensor for signalling the position of the traveling member (11) with respect to the support member (1). However, many other sensing means would also be operable, for example: photo optic, differential transformers, etc. The Hall Effect sensor is preferred because, among other reasons, it utilizes two parts which do not touch one another, and its output is relatively linear over the preferred range of travel of the traveling member (11). The use of ferrous materials in or around the tension measurement device should be avoided as they affect the device by affecting the magnet (16) thereon.

Sensors which are comprised of two parts which are separated by a space are preferred over other types of sensors, such as magneto elastic sensors or strain gauges. Both magneto elastic sensors and strain gauges are relatively fragile as they must be protected against overloads which will cause permanent deformation of the sensors. Protecting strain gauges and magneto elastic sensors against overloads is difficult due to the very small distances through which these gauges move during operation. Furthermore, because these gauges operate over such small distances of travel, viscous fluid damping is extremely difficult, unlike the device of the present invention.

In the device of the present invention, any meaningful use of the Hall Effect Sensor (15) necessitates that the full range of movement of the traveling member (11) be at least 0.010 inches, preferably the maximum travel of the traveling member is between 1mm and 20mm. The most preferred full range of travel of the traveling member (11) is approximately 0.125 inches. It has been conceived that there is no limit on the maximum distance of travel of the traveling member (11), but it is recognized that a practical maximum distance does exist as the magnet (16) loses its ability to affect the Hall Effect device once displaced very far from the device. In a case where a travel distance up to 0.750 inches is desired, an operable embodiment would use two magnets spaced laterally approximately one inch apart, one magnet to the left of the sensor having its north pole facing the sensor and the other magnet to the right of the sensor having its south pole facing the sensor.

The present invention is directed towards a device which has a traveling member, the traveling member being displaceable a distance X by a force f, the force f being substantially the same amount of force as is required to deform the resilient connecting members enough for the traveling member to be displaced the distance X. Several definitions underly this statement. First, the distance X refers to the distance traveled by the traveling member (11), where the traveling member is originally in its *rest position* before force f is exerted on the traveling member. Secondly, the force f is that force, or force component, which is in the direction of travel of the traveling member. Thirdly, the effects of damping must be ignored—i.e. the force must be exerted for enough time that the traveling member reaches its equilibrium position. In the claims herein, this description underlies the statement that the traveling member will repeatedly travel distance X when subjected to the force f.

The device of the present invention may be utilized on virtually any machine which is used to process yarn. The device may be used at any place on the yarn path in which the yarn undergoes a change in direction. Of course, in order to use the preferred device, which employs viscous damping, the device must be installed substantially "upright" in order to keep the damping fluid in the cavity within the traveling member. In order to obtain good sensitivity with the preferred device, the direction of the force created by a yarn tension increase should have a significant force component in the direction of travel of the traveling member. Also, since the roller contacts the yarn the device cannot be used at a point in yarn processing in which the yarn remains molten, i.e. above the yarn "stick point" in an extrusion operation, for example.

A preferred device was constructed and used on a yarn processing machine. The device used two leaf spring connecting members as shown in the Figures. The springs were made from 1095 Mill Temper Spring steel having a thickness ranging from 0.0098 inches to 0.0102 inches, the springs being manufactured by Associated Springs of Dayton, Oh. The springs were proportioned substantially as shown in the Figures, the connecting portion (7) having a length of 1.450 inches and the end portions (5 and 8) each having lengths of 0.450, the "width" of the spring being 0.500 inches. The ends were bent 90° with respect to the connecting portion, the bends having a radius of approximately 1/16 inches.

The Hall-Effect sensor (15) utilized in the preferred device was purchased from MICRO SWITCH, 517 South Sharon Amity Road, Charlotte, N. C. 28222. The sensor was catalog listing 915512-2. The permanent magnet (50) and mount (16) were also purchased from MICRO SWITCH, the mount (16) and magnet (50) being purchased as a single part, number 106MG10.

The support member (1) and the traveling member (11) were both machined from 2024 aluminum. The support member had overall dimensions of 2.420 inches ×1.630 inches ×.810 inches, and was proportioned substantially as illustrated. The traveling member (11) had overall dimensions of 2.260 inches ×1.000 inches ×0.575 inches, and was proportioned substantially as shown in the Figures.

The preferred device was utilized on a machine which was processing a 1300 denier multifilament nylon 6 yarn. The yarn was under a tension of 175 grams ±30 grams during normal operation. The device was aligned and operated so that during operation of the machine, a voltage output of approximately 6 was obtained from the Hall Effect device.

The claims herein are intended to cover the concepts underlying the present invention, and are not intended to be limited to the preferred device alone.

I claim

1. A device for measuring tension in elongated flexible articles, the device comprising:
   (a) a support member which is fixed in position; and
   (b) a traveling member; and
   (c) an article-contacting means which is attached to the traveling member; and
   (d) two deformable, resilient connecting members, each of the connecting members having a first end which is fixedly attached to the support member and a second end which is fixedly attached to the traveling member, the connecting members providing a resisting force with respect to travel of the traveling member, and
   (e) an assembly of the support member, the connecting members, and the traveling member forming a four sided device, the traveling member being displaceable a distance X by a force f, the force f being substantially the same amount of force as is required to deform the resilient connecting members enough for the traveling member to be displaced the distance X, the traveling member having a displacement range of more than 0.010 inches; and
   (f) a position sensor which is comprised of two parts which are separated by a space, the first part of the sensor being mounted on the support member and a second part of the sensor being mounted on the traveling member.

2. A device as described in claim 1 wherein the four sided device has substantially the shape of a parallelogram.

3. A device as described in claim 2 wherein the connecting members are leaf springs.

4. A device as described in claim 3 wherein the leaf springs are bent so that they have end portions on each end, the end portions being securely fastened to the support member and the traveling member.

5. A device as described in claim 2 wherein the position sensor parts are comprised of Hall-effect device and a magnet.

6. A device as described in claim 2 wherein the article-contacting means is a roller which is mounted on a bearing.

7. A device as described in claim 2 wherein viscous damping is effected between the support member and the traveling member.

8. A device as described in claim 2 wherein the device is oriented so that the traveling member is suspended below the support member.

9. A device as described in claim 2 wherein the maximum travel of the traveling member is between 1 and 20 millimeters.

10. A device as described in claim 2 wherein the connecting members are comprised of a pair of leaf springs of substantially equal length and the length of the support member is substantially equal to the length of the traveling member, so that a substantially rectangular device results, the device having a Hall-effect device mounted on the support member and a magnet mounted on the traveling member, the device having a maximum travel distance of between 3 and 5 millimeters, the device having viscous damping employed between the support member and the traveling member, the device having the traveling member suspended from the support member by a pair of leaf springs.

11. A device as described in claim 1 wherein the connecting members are leaf springs.

12. A device as described in claim 11 wherein the leaf springs are bent so that they have end portions on each end, the end portions being securely fastened to the support member and the traveling member.

13. A device as described in claim 1 wherein the position sensor parts are comprised of a Hall-effect device and a magnet.

14. A device as described in claim 1 wherein the article-contacting means is a roller which is mounted on a bearing.

15. A device as described in claim 1 wherein viscous damping is effected between the support member and the traveling member.

16. A device as described in claim 1 wherein the device is oriented so that the traveling member is suspended below the support member.

17. A device as described in claim 1 wherein the maximum travel of the traveling member is between 1 and 20 millimeters.

* * * * *